No. 791,057. PATENTED MAY 30, 1905.
W. G. TODHUNTER.
SPEED INDICATOR AND TIME REGISTER.
APPLICATION FILED SEPT. 28, 1903.

2 SHEETS—SHEET 1.

Witnesses:
John E. Dousfield.
C. G. Redfern.

Inventor:
W. G. Todhunter

No. 791,057. PATENTED MAY 30, 1905.
W. G. TODHUNTER.
SPEED INDICATOR AND TIME REGISTER.
APPLICATION FILED SEPT. 28, 1903.

2 SHEETS—SHEET 2.

Witnesses:
John E. Bousfield
C. G. Redfern

Inventor:
W. G. Todhunter

No. 791,057.

Patented May 30, 1905.

UNITED STATES PATENT OFFICE.

WILLIAM GRAHAM TODHUNTER, OF PLUMSTEAD, ENGLAND.

SPEED-INDICATOR AND TIME-REGISTER.

SPECIFICATION forming part of Letters Patent No. 791,057, dated May 30, 1905.

Application filed September 28, 1903. Serial No. 174,891.

*To all whom it may concern:*

Be it known that I, WILLIAM GRAHAM TODHUNTER, a subject of the King of Great Britain, residing at 213 Burrage road, Plumstead, county of Kent, England, have invented a new and useful Speed-Indicator and Time-Register, of which the following is a specification.

This invention relates to a speed-indicator and time-register chiefly for use on motor road-vehicles and with ships' logs.

According to the invention the improved apparatus comprises a clock, to the hour-arbor of which is conveniently attached a plate, frame, or the like adapted to carry a disk or ring of paper or other suitable material, so that the said disk rotates with the hour-arbor. In conjunction with the paper disk or ring I provide a pricker for perforating the said disk or ring, and this perforating is effected by relative movement between the disk or ring and the pricker through the medium of a projection which is rotated by the moving vehicle or log in the same direction as that in which the hour-arbor and paper disk move. It will therefore be seen that the perforations in the paper disk, one of which is made at each revolution of the said projection, give a measure of the speed of the vehicle. Counting mechanism is also advantageously provided for indicating total distance passed through, and a device can be furnished for giving an audible signal at intervals—for example, on the completion of each mile of motion.

Figure 1:
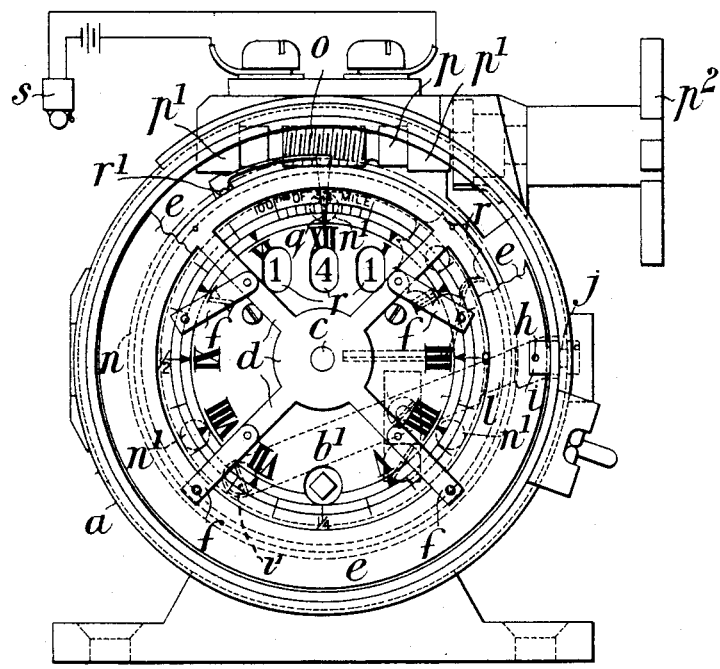
Figure 2:
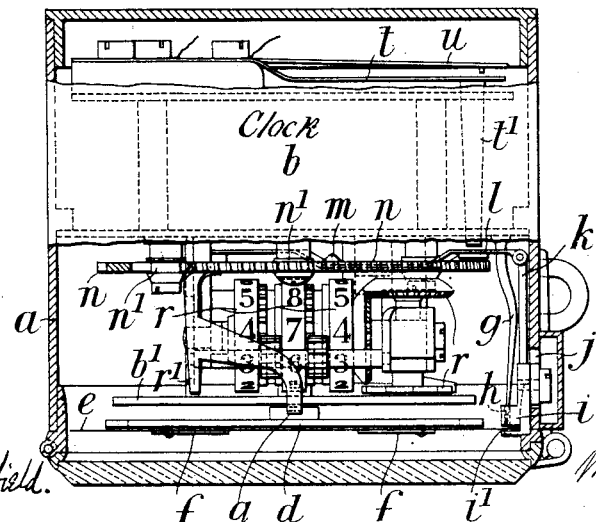
Figure 3:
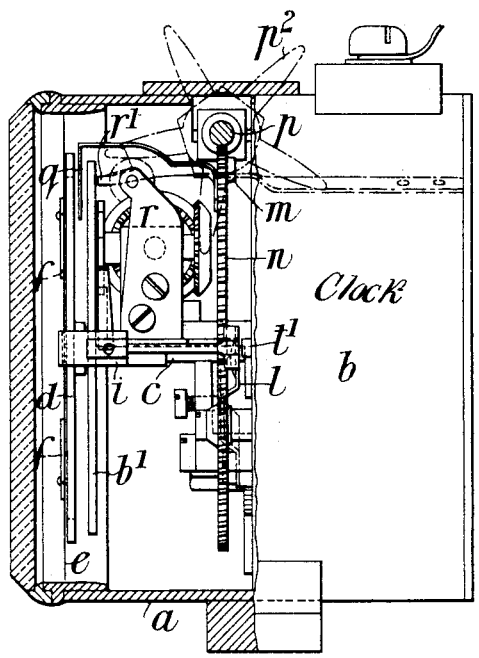
Figure 4:
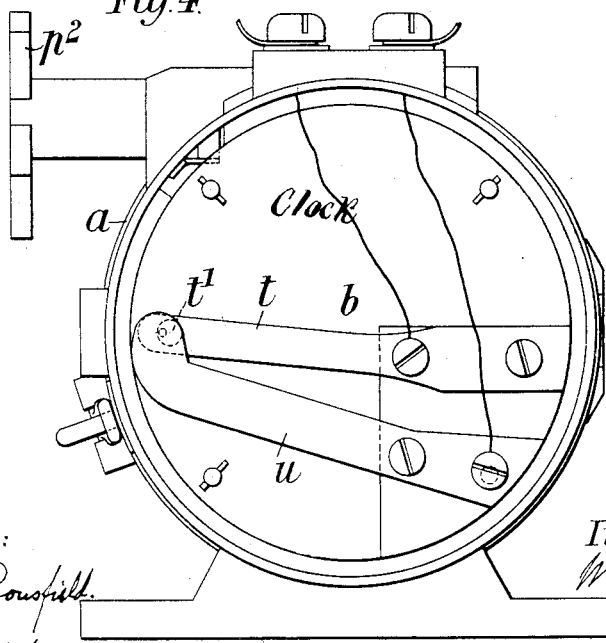

In the accompanying drawings, Figure 1 is a front elevation of apparatus made according to the invention and designed for use upon road-vehicles. Fig. 2 is a sectional plan view. Fig. 3 is a sectional side view, and Fig. 4 is a rear elevation of the device with the back of the case removed to show the interior.

$a$ is a case or box, and $b$ is the clock, which is fitted therein, said clock being of any suitable construction. The details thereof have been omitted in the drawings.

$c$ is the hour-arbor of the clock, and $d$ is the frame, which is keyed to the arbor $c$ and which is adapted to receive the paper ring $e$, secured thereto by the clips $f f$ on the frame $d$.

$g$ is the pricker, which is rigidly fixed to the case $a$ and the point of which extends into a hole $h$ in a slide $i$. This slide $i$ is held in a guide $j$ in the case $a$ and is provided with a slit $i'$, into which the paper ring $e$ extends, the point of the pricker being normally behind the said ring, as clearly shown in Fig. 2. To prick the paper $e$, the slide $i$ is pulled along the guide $j$, and this is effected through the medium of a rod $k$, which is secured to the said slide $i$ and is jointed at its inner end to an arm $l$, preferably a spring-arm. The arm $l$ is secured at one end, as at $l'$, to a stationary part of the frame. To depress this arm $l$, and thus force the paper ring $e$ onto the pricker-point at regular intervals corresponding to a series of distances of predetermined length passed through by the vehicle to which the apparatus is attached, I provide a cam projection $m$ upon a worm-wheel $n$, which is preferably annular and mounted upon rollers $n'$ and has its axis coincident with that of the hour-arbor and which gears with a worm $o$, keyed upon a spindle $p$, held in bearings $p'$ on the case $a$ of the apparatus, the said spindle being adapted to be intermittently rotated through the medium of the star-wheel $p^2$, which receives its motion from one of the driving-wheels of the vehicle, being moved through one tooth for each revolution of the said vehicle-wheel.

In the drawings the circumference of the clock-face $b'$ is shown graduated in one one-hundredth of a mile, (the whole circumference corresponding to the distance of one mile,) and a pointer $q$, secured to the worm-wheel $n$, passes over the graduations upon the said clock-face $b'$ as the worm-wheel rotates. It will therefore be seen that a perforation is made in the paper ring $e$ for each mile through which the vehicle moves, and the number of perforations made while the paper ring $e$ has passed through an angular distance corresponding to one hour on the clock-face gives the average speed of the vehicle in miles per hour during that interval.

$r$ is a counting mechanism of ordinary construction which is fitted within the case $a$ and is operated by a stud or finger $r'$ upon the worm-wheel $n$. This mechanism indicates the total distance passed through by the vehicle.

$s$ is an electric bell which is adapted to give an audible signal each time the vehicle has passed through, say, one mile. This is effected by closing an electric circuit in which the bell is inserted once for every revolution of the worm-wheel $n$. To this end the movement of the arm $l$ by the cam projection $m$ pushes a spring-contact $t$, through the medium of the projection $t'$, against another spring-contact, $u$, thereby closing the electric circuit at the same moment that a perforation is being made in the paper ring $e$.

It is to be understood that although I have particularly described my invention as applied to apparatus for use on road-vehicles the said apparatus is also applicable for use in connection with ships' logs.

Having now particularly described and ascertained the nature of my said invention and in what manner the same is to be performed, I declare that what I claim is—

1. In a speed-indicator and time-register the combination with a clock mechanism, of a rotatable frame operatively connected with the hour-arbor of the clock mechanism, and adapted to be rotated once for each revolution of the hour-arbor, said frame being constructed to carry a removable paper ring, a stationary pricker having its point located adjacent to the path of said paper ring, a transversely-movable device having a fixed relation to the path of said paper ring, located adjacent to said pricker, capable of movement transversely of said paper ring, and having a part for engaging the paper ring on the side opposite said pricker, to force said paper upon said pricker and mechanism operated by the movement of the vehicle for operating said transversely-movable device, to puncture the paper, substantially as described.

2. In a speed-indicator and time-register, the combination with a clock, of a frame mounted on the hour-arbor thereof and adapted to carry a removable paper ring, a stationary pricker mounted transversely of said paper ring, a sliding member adapted to engage the edge of said ring and force it against said pricker, a rotating member actuated by the movement of the vehicle or the like, the speed of which is to be indicated, a worm-wheel operatively connected with said rotating member, a cam on said worm-wheel for engaging parts connected with said sliding member whereby said paper ring is forced against said pricker and a spring for returning said sliding member to normal position, substantially as and for the purpose described.

3. In a speed-indicator and time-register, the combination with a clock, of a frame mounted on the hour-arbor thereof and adapted to carry a removable paper ring, a stationary pricker mounted transversely of said ring, a sliding member adapted to engage the edge of said ring and force it against said pricker, a spring-arm having one end secured to a stationary part and having its free end pivoted to said sliding member, a rotating member actuated by the motion of the vehicle or the like, the speed of which is to be indicated, a worm-wheel operatively connected with said rotating member, a cam on said worm-wheel adapted to strike said spring-arm whereby said paper ring is pressed against said pricker, an electric circuit, a bell located therein, and a spring-contact adapted to be actuated by a cam on said worm-wheel to close said circuit simultaneously with the movement of said sliding member, substantially as and for the purpose described.

WILLIAM GRAHAM TODHUNTER.

Witnesses:
JOHN E. BOUSFIELD,
C. G. REDFERN.